Dec. 4, 1923.

W. R. STUCK

FLOWER HOLDER

Filed Jan. 21, 1922

1,476,553

Inventor:
W. R. Stuck.
by Hazard & Miller
Attys.

Patented Dec. 4, 1923.

1,476,553

UNITED STATES PATENT OFFICE.

WILLIAM R. STUCK, OF LOS ANGELES, CALIFORNIA, ASSIGNOR, BY MESNE ASSIGNMENTS, TO THE DAZEY MANUFACTURING COMPANY, OF LOS ANGELES, CALIFORNIA, A CORPORATION OF CALIFORNIA.

FLOWER HOLDER.

Application filed January 21, 1922. Serial No. 530,803.

*To all whom it may concern:*

Be it known that I, WILLIAM R. STUCK, a citizen of the United States, residing at Los Angeles, in the county of Los Angeles and State of California, have invented new and useful Improvements in Flower Holders, of which the following is a specification.

My invention relates to a flower holder of the general type disclosed in U. S. Letters Patent No. 1,196,312, issued to me August 29, 1916, the principal objects of my present invention being to generally improve upon and simplify the construction of the holder disclosed in my aforesaid patent; to provide a flower holder that is of relatively simple and inexpensive structure, thereby enabling it to be easily and cheaply produced; and, further, to provide a holder of skeleton form that may be readily positioned in a suitable container and which will serve as a support for the stems of flowers, in order that the latter may be artistically arranged in a container, such as a vase, bowl or the like.

With the foregoing and other objects in view, my invention consists in the features of construction and combination and arrangement of parts hereinafter more fully described and claimed, reference being had to the accompanying drawings, in which:

Figure 1:
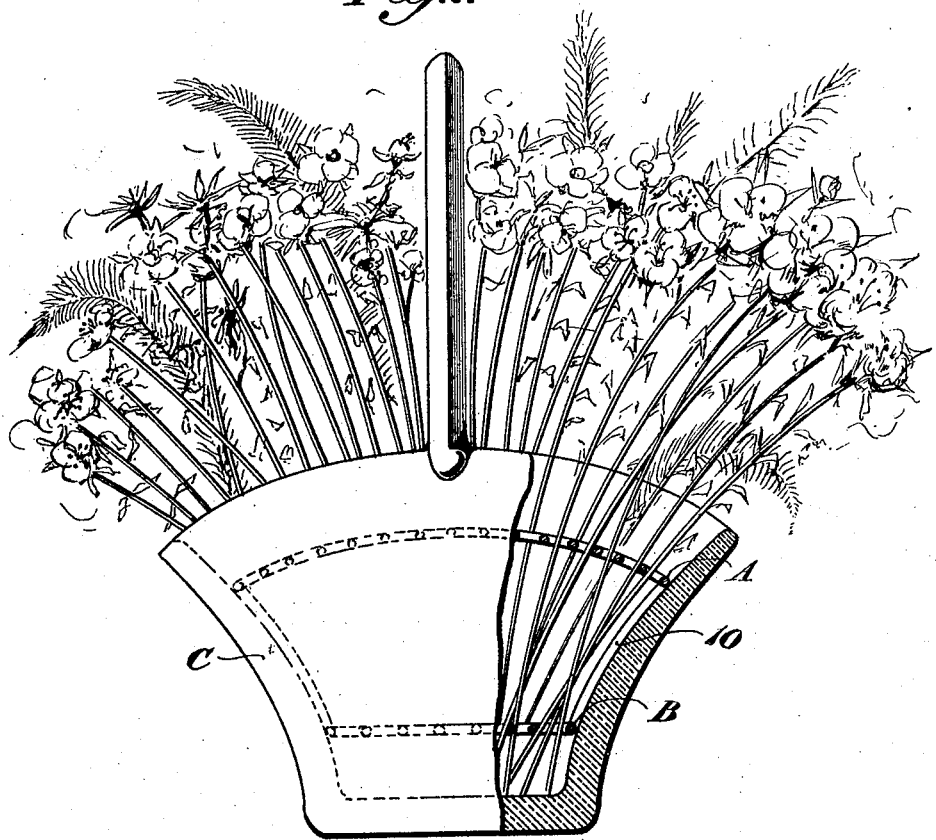
Figure 1 is a side elevational view of a container in which is located a flower holder of my improved construction, with parts of the container and holder in section in order to more clearly show the arrangement of the stems of the flowers in the holder.
Figure 2:
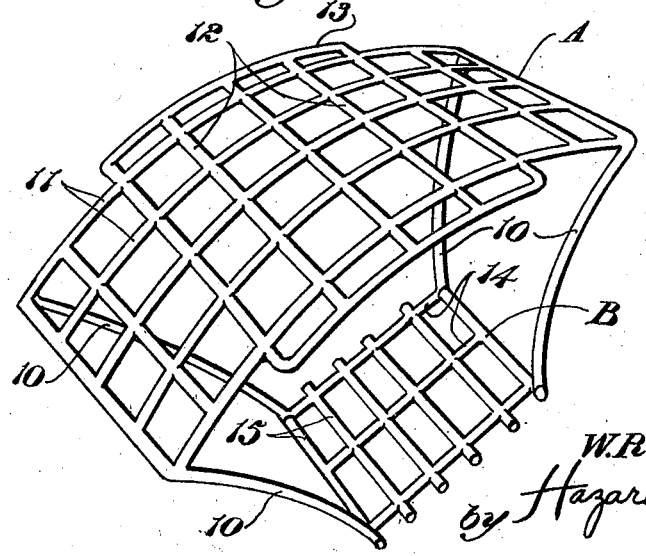
Figure 2 is a perspective view of a flower holder of my improved construction.

The particular form of flower holder herein illustrated comprises an upper reticulated or foraminous member A and a lower foraminous or reticulated member B, said members being united by substantially upright members 10. The member A may be composed of a plate of metal in which are formed openings, or, as illustrated in Figure 2, said member may be composed of a series of longitudinally disposed rods 11 that are preferably arranged parallel with each other, and a series of transversely disposed rods 12 that occupy positions parallel with each other and which are arranged substantially at right angles to the rods 11. The rods of members 11 and 12 are preferably formed integrally with each other, and as a result a reticulated structure is provided, and in order that the flowers that are placed in the holder may be spread over a relatively wide area the reticulated member A is preferably curved lengthwise and with its central portion higher than its ends. As illustrated in Figure 2 this reticulated member is greater in length than width, in order that it may be conveniently arranged in the upper portion of a container C of glass or earthenware, which is shaped to represent an ornamental basket. If desired, the upper reticulated member A may be provided on its sides with lateral extensions 13, each of which comprises a relatively short longitudinally disposed member and a series of short transversely disposed members.

The lower reticulated member B may be formed from a sheet of material in which is formed a series of openings or, as illustrated, it may be composed of a series of longitudinally disposed members 14 and a series of transversely disposed members 15, the latter being arranged substantially at right angles to the members 14. The length and width of this lower member are less than the corresponding dimensions of the upper member A, in order that said lower member may occupy a position in the lower portion of the vase or container C, and when properly positioned in said vase or container the lower reticulated or foraminous member B occupies a position a short distance above the bottom of said vase or container, thus providing a support for the lower portions of the stems of the flowers at points above their lower ends. As shown in Figure 2, the upright members 10 are preferably arranged between the corresponding corners of the members A and B, and in order to simplify and minimize the cost of manufacture of the holders the entire structure, including the reticulated members A and B and the uprights 10, are formed integrally, thereby providing a relatively light, strong and substantial structure that may be readily positioned in a container and which will serve as a firm and substantial support for the stems of flowers.

Obviously the holder may be made in various shapes and sizes to fit different forms of holders and vases, but in each instance the holder should be constructed so that the lower member B occupies a position within the container a short distance above the bottom thereof, so that the stems of the flowers placed in the holder will have bearing against the parts of the upper and lower members A and B at separated points so that said stems will be firmly supported in the desired positions.

Flower holders of my improved construction may be easily and cheaply produced and provide simple and efficient means for holding flowers in a bowl, vase or like container.

It will be understood that various minor changes in the size, form and construction of the parts of my improved flower holder may be made and substituted for those herein shown and described without departing from the spirit of my invention, the scope of which is set forth in the appended claims.

I claim:

1. A flower holder comprising an upper reticulated member of arcuate form, a lower reticulated member which is flat and smaller than the first member, and upright members connected to the corners of the upper and lower members and curved outwardly from the lower member to the upper member.

2. A flower holder comprising an upper reticulated member of arcuate form, a lower reticulated member which is flat and smaller than the first member, and upright members connected to the corners of the upper and lower members and curved outwardly from the lower member to the upper member and lateral extensions formed in the upper member.

3. In combination, a container having straight sides and outwardly curved ends, and a flower holder comprising an upper reticulated member of arcuate form, a lower reticulated member, and uprights connecting the members and curved to conform to the contour of the ends of the container.

In testimony whereof I have signed my name to this specification.

WILLIAM R. STUCK.